United States Patent

[11] 3,623,697

| [72] | Inventor | George Alfred Braisby Austin<br>Noble Park, Victoria, Australia |
|---|---|---|
| [21] | Appl. No. | 873,866 |
| [22] | Filed | Nov. 4, 1969 |
| [45] | Patented | Nov. 30, 1971 |
| [73] | Assignee | Illinois Tool Works Inc.<br>Chicago, Ill. |

[54] COCKS OR TAPS
3 Claims, 10 Drawing Figs.

[52] U.S. Cl..................................................... 251/261,
251/284, 251/297
[51] Int. Cl..................................................... F16k 31/524
[50] Field of Search........................................... 137/329,
329.01–329.06, 315, 316; 251/214, 215, 284, 291,
297, 251–261

[56] References Cited
UNITED STATES PATENTS

| 2,408,006 | 9/1946 | Smith........................... | 251/257 X |
| 2,534,577 | 12/1950 | Courtot......................... | 251/258 X |
| 3,064,941 | 11/1962 | Stromberg.................... | 251/260 |
| 3,134,569 | 5/1964 | Sidenbender et al. ......... | 251/214 |
| 3,434,694 | 3/1969 | Skinner......................... | 137/315 X |
| 3,481,367 | 12/1969 | Deuschle...................... | 251/368 X |
| 3,496,958 | 2/1970 | Magnusson et al. ........... | 137/315 |
| 3,503,586 | 3/1970 | Bordes ......................... | 251/284 X |

Primary Examiner—M. Cary Nelson
Assistant Examiner—David R. Matthews
Attorneys—Robert W. Beart, Michael Kovac, Barry L. Clark and Jack R. Halvorsen ABSTRACT: A tap, particularly for use on petrol engines and the like for control of the flow of petrol to the engine, is provided with a body portion having a fluid inlet and a fluid outlet, and an operating spindle extending into the body portion. The spindle carries an eccentrically disposed journal having a resilient sealing bush, and on rotation of the spindle, the sealing bush engages and seals the fluid inlet in the body portion. Fluid-sealing means are provided between the body portion and the spindle to prevent leakage of fluid along the spindle, and means are provided on the body portion and the spindle to limit rotational movement of the spindle and to provide means for securing the spindle in the body portion.

PATENTED NOV 30 1971 3,623,697

INVENTOR
George Alfred Braisby Austin
BY
His Att'ys

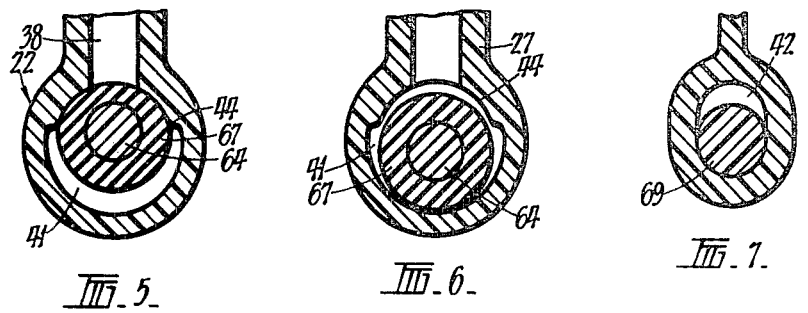
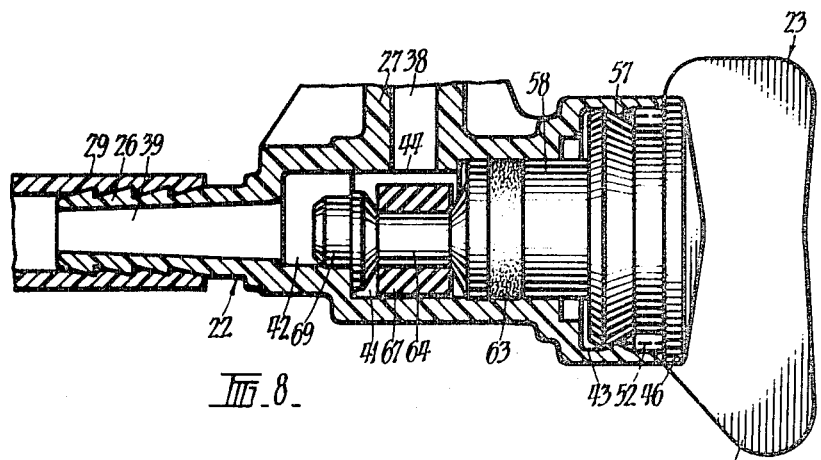
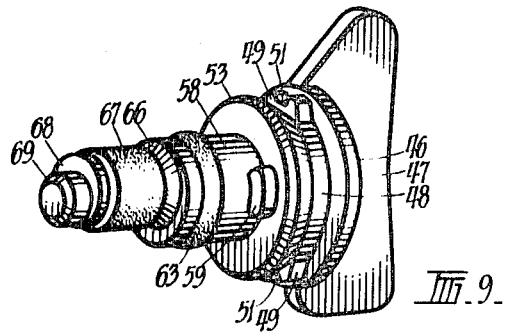
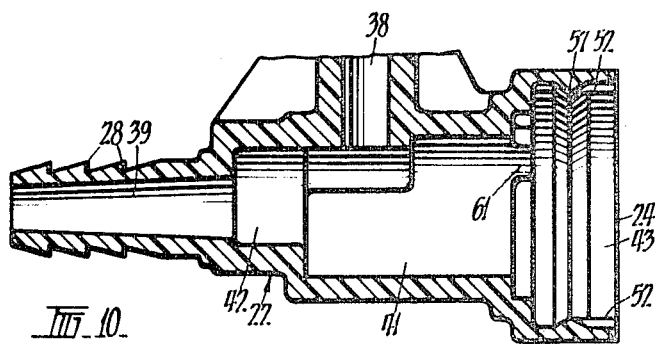

COCKS OR TAPS

This invention relates to improvements in taps and relates particularly, but not exclusively, to an improved tap for controlling the flow of a liquid through a liquid line.

At present, taps used on a liquid line, for example, on petrol lines in petrol engine-powered machines, are generally of a slide type or a screwdown type. In taps of the slide type, an interference must be provided between the slide and the body of the tap, but this interference must be minimal to permit easy operation of the slide. However, after a period of use, this minimal interference becomes less due to wear and results in leakage from the tap.

In some taps of the push-pull type, O-ring seals are provided on the tap spindle to obviate the need for an interference between the spindle and the body, However, "cold flow" of the material of the body of the tap caused by outward pressure of the O-ring seal deforms the body around the O-ring seal and a groove results.

The internal groove provides an undesirable resistance which must be overcome to operate the valve spindle as the spindle moves in a direction transverse to the plane of the groove and the O-ring must be pushed or pulled out of the groove on each operation of the tap.

With taps of the screwdown type, the sealing interferences depend on the forces applied to the screwed spindle and thus is dependent on the operator's judgment. Excessive tightening of the spindle produces excessive wear on the seal and sealing face.

It is an object of the present invention to provide an improved tap which avoids the above-stated disadvantages.

It is a further object of the invention to provide an improved tap which is simple in construction and which provides a positive seal against the flow of fluid through the tap when in the "off" position.

A further object of the invention is to provide an improved tap which is relatively simple and economical to manufacture.

A still further object is to provide a tap having eccentrically disposed valve means movable in a fluid chamber to sealingly engage the fluid inlet.

A still further object is to provide a tap having a sealing bush mounted on an eccentrically disposed journal and means for causing the bush to be compressed between the fluid inlet and the journal when the tap is in the "off" position.

A still further object of the invention is to provide means for preventing vibration of the like causing the tap to move from its set position.

In order that the invention may be more readily understood and put into practical form one embodiment thereof will now be described with reference to the accompanying drawings, wherein:

FIG. 5 is a sectional view taken along the lines 5—5 of FIG. 2;

FIG. 6 is a sectional view similar to FIG. 5 but with the spindle rotated 180° to the "on" position;

FIG. 7 is a sectional view taken along the lines 7—7 of FIG. 2;

FIG. 8 is a part sectional side elevational view of the tap with the spindle in the "on" position;

FIG. 9 is a perspective view of the spindle of the tap; and

FIG. 10 is a part-sectional view of the body of the tap with the spindle removed.

Figure 1:
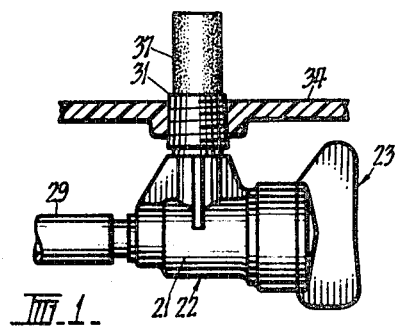
FIG. 1 is a side elevational view of a tap according to the present invention.
Figure 2:
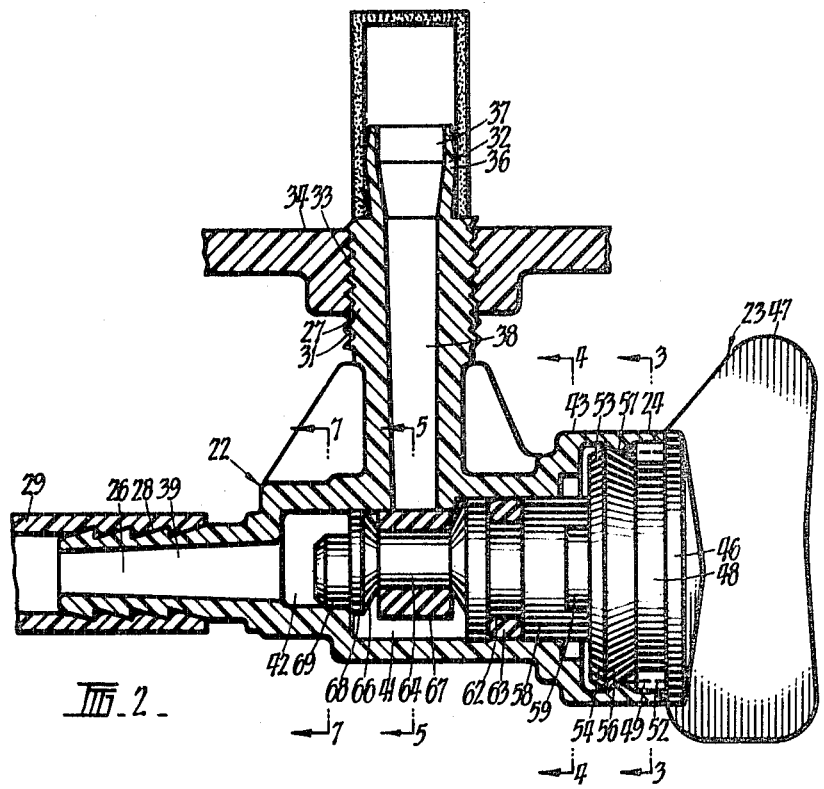
FIG. 2 is an enlarged cross-sectional side elevational view of the tap with the spindle in the "off" position.

Referring to the drawings, the tap 21 comprises a body portion 22 and a spindle 23 each formed of a synthetic plastic material, such as nylon, by suitable moulding or plastic working techniques.

The body portion 22 is of hollow configuration, open at one end 24, and is provided with a fluid outlet post 26 at its other end, and a fluid inlet post 27 extending at right angles to the outlet post 26. The outlet post 26 is formed with external serrations 28 for the receipt, in a known manner, of a resilient conduit 29, for example, a synthetic plastic hose or pipe.

The inlet post 27 is provided with a threaded portion 31 and a formed end 32 adapted to receive a filter member 37. The threaded portion 31 of the inlet post 27 is preferably tapered so that the tap 21 may be securely engaged in a threaded hole 33 in a fluid reservoir 34, for example, a petrol tank on a motor mower. The end 32 of the inlet post 27 is formed with a peripheral enlargement 36 and the sintered filter 37 is a push-fit on the enlargement 36.

Each of the inlet post 27 and outlet post 26 is provided with a bore 38 and 39, respectively, which communicates with the hollow interior of the body portion 22. The bores 38 and 39 may be tapered, as illustrated, to facilitate the moulding of the body portion 22.

The hollow interior of the body portion 22 is formed with a substantially cylindrical fluid chamber 41 terminating at its inner end in a substantially oval part 42 into which the outlet bore 39 opens. At its outer end, the chamber 41 opens into a housing 43 suitably formed for the reception of the tap spindle 43.

The chamber 41 is provided with an internally raised portion 44 surrounding the inlet bore 38 and merging into the walls of the chamber 41, on either side of the bore 38, as shown in FIGS. 5 and 6.

Figure 3:
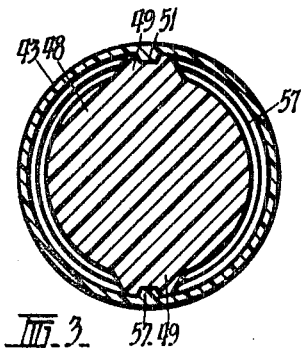
FIG. 3 is sectional view taken along the lines 3—3 of FIG. 2.

The spindle 23, adapted to be mounted in the housing 43 and to extend into the chamber 41, comprises an outer closure part 46 of circular shape having a finger piece 47 thereon to facilitate rotation of the spindle. Inwardly of the closure part 46, the spindle 23 is formed with a substantially cylindrical section 48 having tow diametrically opposed circumferential projections 49 with axially extending grooves 51 formed centrally of each projection 49. The housing 43 is provided with corresponding locating ribs 52 which engage in the groove 51 when the spindle is in the "off" position shown in FIG. 3, or the "on" position as shown in FIG. 8. The dimensions and shape of the projections 49 and the ribs 52, and the resilience of the material from which the body 22 is formed, ensures that the cooperating ribs 52 and projections 49 provide only a locating action for the spindle at the "off" and "on" positions, and acts to provide a resistance against any tendency for the spindle to rotate about its axis due to vibration or accidental knocks and the like.

Inwardly of the section 48, the spindle 23 is formed with a radially outwardly tapered or conical surface 56 and an opposed inner conical surface 54 forming a tapered circumferential enlargement 53. A correspondingly shaped annular internal rib 57 is formed on the housing, and the tapered surfaces cooperate to provide a snap engagement of the circumferential enlargement 53 with the housing with the outer conical surfaces 56 located behind the rib 57.

Figure 4:
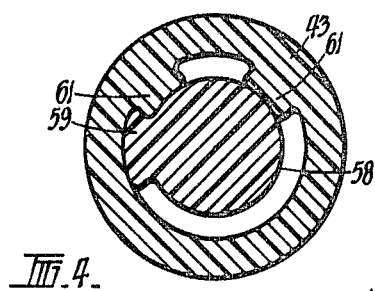
FIG. 4 is an sectional view taken along the lines 4—4 of FIG. 2.

The spindle 23 is formed with a cylindrical portion 58 inwardly of the circumferential enlargement 53 to snugly engage in the chamber 41. A lug 59 projects radially from the cylindrical portion 58 adjacent the circumferential enlargement and limit stops 61 are provided in the housing 43 to engage the lug 59 to thereby limit rotational movement of the spindle. The relative angular positions of the limit stops 61 and the lug 59 are shown in FIG. 4 when the spindle is in the "off" position and an angular rotation of the spindle 180° is obtainable to move the spindle fully to the "on" position.

The cylindrical portion 58 of the spindle 23 is provided with a circumferential groove 62 of substantially rectangular cross section and an "O"-ring seal 63 is positioned in the groove and sealingly engages with the wall of the groove 62. The seal 63 is preferably of a material capable of withstanding petrol and petrol/oil mixtures, such as nitrile rubber.

On the end of the cylinder portion 58, the spindle is formed with an axially extending eccentrically disposed journal 64 on which is mounted a substantially cylindrical resilient sealing bush 67. The bush 67 is located on the journal 64 between two tapering surfaces 66 at either end thereof and it is able to rotate relative to the journal 64.

The end of the journal 64 is formed with a flange 68 which locates against the end wall of the chamber 41, and a spigot extends axially of the flange 68 and coaxially with the cylindrical portions 58 into the oval part 42 which acts as a bearing support therefor.

The sealing bush 67 is disposed immediately adjacent the inlet post 27 and on rotation of the spindle 23 from the "on" position shown in FIGS. 6 and 8 the bush contacts the raised portion 44 around the inlet post 27. The interference contact results in the bush 67 rolling around the raised portion 44 until the spindle reaches the "off" position. As shown in FIG. 5, at the "off" position the bush 67 is compressed between the journal 64 and the raised portion 44 providing a positive seal of the inlet bore 38.

Engagement of the lug 59 with one of the limit stops 61 limits the rotational movement of the spindle 23, when the tap is in the fully "off" position as shown in FIG. 5 and at this position the ribs 52 on the housing are engaged in the grooves 51.

To turn the tap to the "on" position, a rotational force is exerted on the finger plate 47 to overcome the resistance of the engagement of the ribs 52 in the grooves 51. The spindle is then rotated approximately 180° until the lug 59 engages the other limit stop 61 and the ribs 52 engage in the grooves 51. At this position, illustrated in FIG. 8, fluid, for example, entering the inlet bore 38 from the reservoir 34 through the filter 37, passes into the chamber 41 past the displaced seal 67 and the spigot 69 and out through the outlet bore 38. The O-ring seal 63 prevents the passage of fluid into the housing 43.

The eccentricity of the journal 64 and the diameter of the sealing bush 67 are determined in relation to the dimensions of the chamber 41 so that, preferably, the sealing bush does not contact the walls of the chamber 41 except at the position of the raised portion 44. The height of the raised portion 44 thus determines the amount of compression of the sealing bush 67 in the "off" position. In this way, and as the sealing bush 67 rotates relative to the journal 64 when in contact with the raised portion 44, wear of the sealing bush is reduced to a minimum whilst the desired compressive force to close the inlet opening is maintained.

What is claimed is:

1. A tap including a hollow body having a cylindrical fluid chamber opening from one end of the body, a fluid outlet extending from the other end of said chamber, a fluid inlet opening into said chamber at right angles to the axis of said chamber, a spindle mounted in said one end of the body to extend into the chamber, cooperating annular shoulders on the body and the spindle, the spindle being snap-fit into the body so that the shoulder on the spindle engages beyond the shoulder on the body to retain same in assembled relation, the internal wall of said cylindrical fluid chamber around and adjacent the fluid inlet being raised to project into the chamber to provide an internally raised portion, an oval recess formed in the end wall of said cylindrical fluid chamber with one extremity of said oval chamber falling in a plane tangent to both said oval recess and said cylindrical fluid chamber, an annular sealing ring mounted in a circumferential groove in the spindle and engaged with said chamber wall in the direction of said shoulder means from said fluid chamber to form a fluid seal between the spindle and the body, gripping means at the outer extremity of said spindle for rotation thereof and the opposite end of said spindle terminating in a spigot coaxial with the spindle, the spigot being smaller than and engaging in the oval recess at the extremity thereof opposite the portion of coplanar with the cylindrical chamber to provide a bearing support for the free end of the spindle, fluid inlet closing valve means intermediate the extremities of said spindle and including an eccentric journal formed on the spindle and a substantially cylindrical sealing bush rotatably mounted on the journal, said bush being engageable, on rotation of the spindle, with said internally raised portion of the wall of the chamber surrounding said fluid inlet, the bush being compressed between the raised portion and the journal, the said cooperating shoulder means for securing the spindle in the body being located in an enlarged housing portion at one end of the body, said housing being of substantially cylindrical shape and having two circumferentially spaced radially inwardly extending limit members each engageable by a lug extending radially outwardly from said spindle when the spindle is at a first and second rotational position, whereby the bush engages with the raised wall portion to seal the fluid inlet at a first position and said fluid inlet and said fluid outlet communicate through said oval recess of said chamber at a second position.

2. A tap according to claim 1 wherein the housing is formed with two radially inwardly extending rib means which are frictionally engaged by locating projections on said spindle when the spindle is in the said first and second rotational positions, the engaged rib means and projections providing a resistance to rotational movement of said spindle.

3. A tap according to claim 2 wherein said first and second positions are angularly spaced 180°.

* * * * *